(12) United States Patent
Kansara et al.

(10) Patent No.: US 11,722,974 B2
(45) Date of Patent: Aug. 8, 2023

(54) SYSTEMS AND METHODS FOR AN OPTIMUM RECEIVER BEAM SELECTION

(71) Applicant: SAMSUNG ELECTRONICS CO., LTD., Suwon-si (KR)

(72) Inventors: Ruchi Bharat Kansara, Gujarat (IN); Kamuganti Vamshidhar, Bangalore (IN); Samir Kumar Mishra, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 132 days.

(21) Appl. No.: 17/470,611

(22) Filed: Sep. 9, 2021

(65) Prior Publication Data

US 2022/0078729 A1 Mar. 10, 2022

(30) Foreign Application Priority Data

Sep. 9, 2020 (IN) .............................. 202041038821
Sep. 8, 2021 (IN) ............................ 2020-41038821

(51) Int. Cl.
  *H04W 56/00* (2009.01)
  *H04B 17/318* (2015.01)
  *H04W 24/10* (2009.01)
  *H04W 76/28* (2018.01)
  *H04B 7/06* (2006.01)
  *H04B 17/327* (2015.01)
  *H04W 24/08* (2009.01)

(52) U.S. Cl.
  CPC ........ *H04W 56/001* (2013.01); *H04B 17/318* (2015.01); *H04W 24/10* (2013.01); *H04W 76/28* (2018.02)

(58) Field of Classification Search
  CPC ... H04W 56/001; H04W 24/10; H04W 76/28; H04W 24/08; H04B 17/318; H04B 7/0695; H04B 7/088; H04B 17/327
  See application file for complete search history.

(56) References Cited

U.S. PATENT DOCUMENTS

| | | | |
|---|---|---|---|
| 11,115,103 B2* | 9/2021 | Guo ..................... | H04B 7/0695 |
| 2018/0367270 A1* | 12/2018 | Raghavan ........... | H04W 72/046 |
| 2020/0037388 A1* | 1/2020 | Nam ..................... | H04W 16/28 |
| 2020/0350974 A1* | 11/2020 | Kim ................... | H04W 74/0833 |
| 2020/0396685 A1* | 12/2020 | Nam ..................... | H04W 72/046 |
| 2021/0235359 A1* | 7/2021 | Caporal Del Barrio ..................... H04L 25/0204 |
| 2022/0014953 A1* | 1/2022 | Teyeb .................... | H04W 24/10 |
| 2022/0338045 A1* | 10/2022 | Nielsen ............... | H04W 56/001 |
| 2022/0377831 A1* | 11/2022 | Li .......................... | H04W 76/14 |

* cited by examiner

*Primary Examiner* — Harry H Kim
(74) *Attorney, Agent, or Firm* — Sughrue Mion, PLLC

(57) ABSTRACT

In an embodiment, a method for optimum Receiver (Rx) beam selection in NR is disclosed. The method includes, performing a Reference Signal Received Power (RSRP) measurement for one or more Rx beams during an idle period as a part of an initial synchronization procedure. The method includes determining an optimum Rx beam amongst the one or more Rx beams with a RSRP peak greater than RSRP peak associated with other Rx beams amongst the one or more Rx beams by a pre-defined offset as a part of a beam-sweep operation. The method further includes pairing the optimum Rx beam with a Transmitter (Tx) beam for a Synchronization Signal Block (SSB) detection in a first half-frame of the SSB Burst upon elapse of the idle period.

10 Claims, 7 Drawing Sheets

SYSTEMS AND METHODS FOR AN OPTIMUM RECEIVER BEAM SELECTION

FIELD OF THE INVENTION

The present disclosure, in general, relates to a networking environment, and, in particular, relates to systems and methods for an optimum receiver beam selection.

BACKGROUND

Traditionally, a New Radio (NR) synchronization procedure includes an initial access procedure and a beam tracking to handle beam adaptation and a radio link failure recovery. The initial access procedure includes selecting a Rx beams for pairing with a Tx beam randomly. The random selection of the Rx beam results in a large amount of power consumption and large amount of time is also taken for the selection.

FIG. 1 illustrates a graphical representation 100 depicting a power consumption for the initial access procedure, in accordance with an existing prior art. In an embodiment, the power consumed may be 1400 units.

Thus, there is a need for a solution that overcomes the above deficiencies.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In accordance with some example embodiments of the present subject matter, a method for optimum Receiver (Rx) beam selection in NR is disclosed. The method includes, performing a Reference Signal Received Power (RSRP) measurement for one or more Rx beams during an idle period as a part of an initial synchronization procedure. The method includes determining an optimum Rx beam amongst the one or more Rx beams with a RSRP peak greater than RSRP peak associated with other Rx beams amongst the one or more Rx beams by a pre-defined offset as a part of a beam-sweep operation. The method further includes pairing the optimum Rx beam with a Transmitter (Tx) beam for a Synchronization Signal Block (SSB) detection in a first half-frame of the SSB Burst upon elapse of the idle period.

In accordance with some example embodiments of the present subject matter, a system for optimum Receiver (Rx) beam selection in NR is disclosed. The system includes a processor configured to perform a Reference Signal Received Power (RSRP) measurement for one or more Rx beams during an idle period as a part of an initial synchronization procedure. The processor is configured to determine an optimum Rx beam amongst the one or more Rx beams with a RSRP peak greater than RSRP peak associated with other Rx beams amongst the one or more Rx beams by a pre-defined offset as a part of a beam-sweep operation. The processor is configured to pair the optimum Rx beam with a Transmitter (Tx) beam for a Synchronization Signal Block (SSB) detection in a first half-frame of the SSB Burst upon elapse of the idle period.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
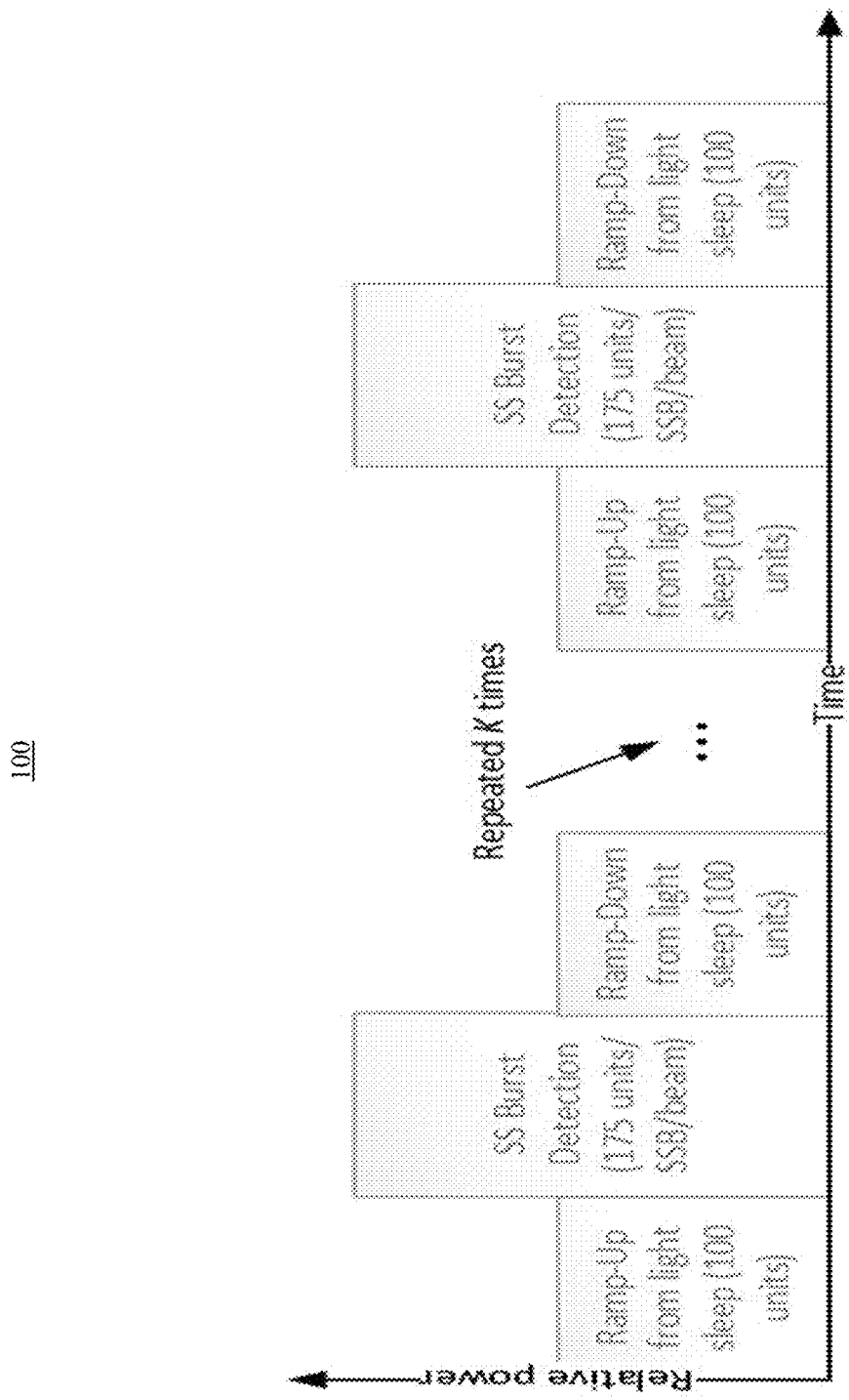
FIG. 1 illustrates a graphical representation 100 depicting a power consumption for the initial access procedure, in accordance with an existing prior art.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

Figure 2:
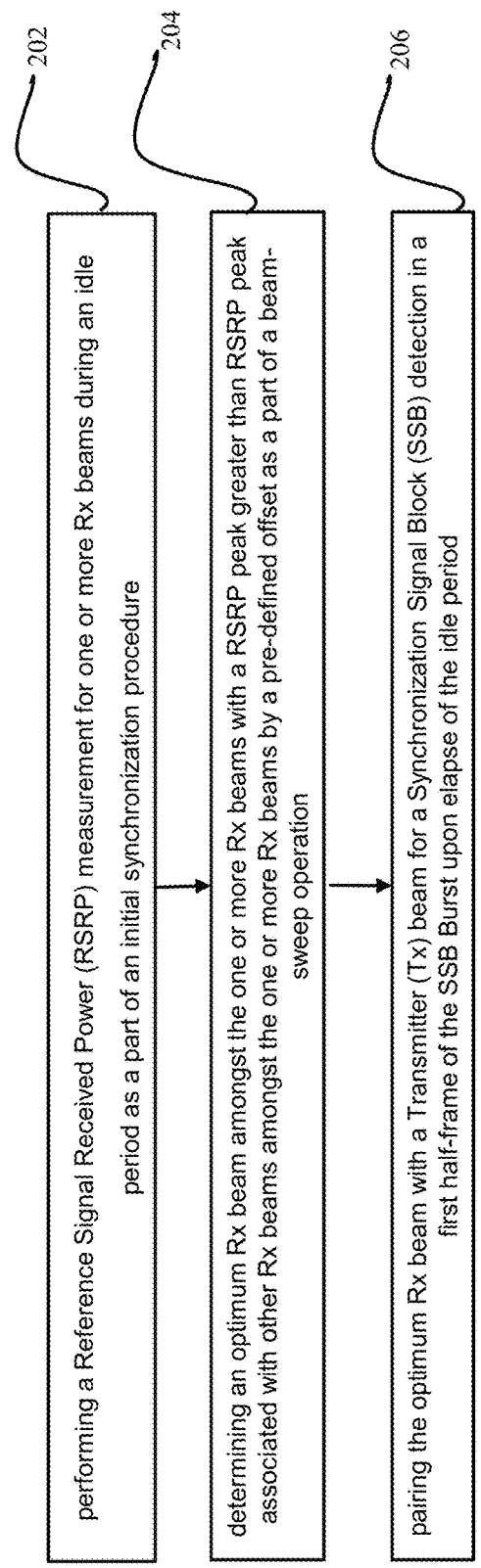
FIG. 2 illustrates a schematic block diagram depicting a method for optimum Receiver (Rx) beam selection in New Radio (NR), in accordance with an embodiment of the present subject matter.

FIG. 2 illustrates a schematic block diagram 200 depicting a method for optimum Receiver (Rx) beam selection in New Radio (NR), in accordance with an embodiment of the present subject matter. In an embodiment, the optimum Rx beam may be selected based on an initial synchronization procedure. In an embodiment, the optimum Rx beam may be selected amongst one or more Rx beams. In an embodiment, the optimum Rx beam may be selected for pairing with a Transmitter (Tx) beam.

Continuing with the above embodiment, the method includes performing (step 202) a Reference Signal Received Power (RSRP) measurement for one or more Rx beams during an idle period as a part of an initial synchronization procedure.

Moving forward, the method may include determining (step 204) an optimum Rx beam amongst the one or more Rx beams with a RSRP peak greater than RSRP peak associated with other Rx beams amongst the one or more Rx beams by a pre-defined offset as a part of a beam-sweep operation.

Subsequent to determining the optimum Rx beam, the method may include pairing (step 206) the optimum Rx beam with a Transmitter (Tx) beam for a Synchronization Signal Block (SSB) detection in a first half-frame of the SSB Burst upon elapse of the idle period.

Figure 3:
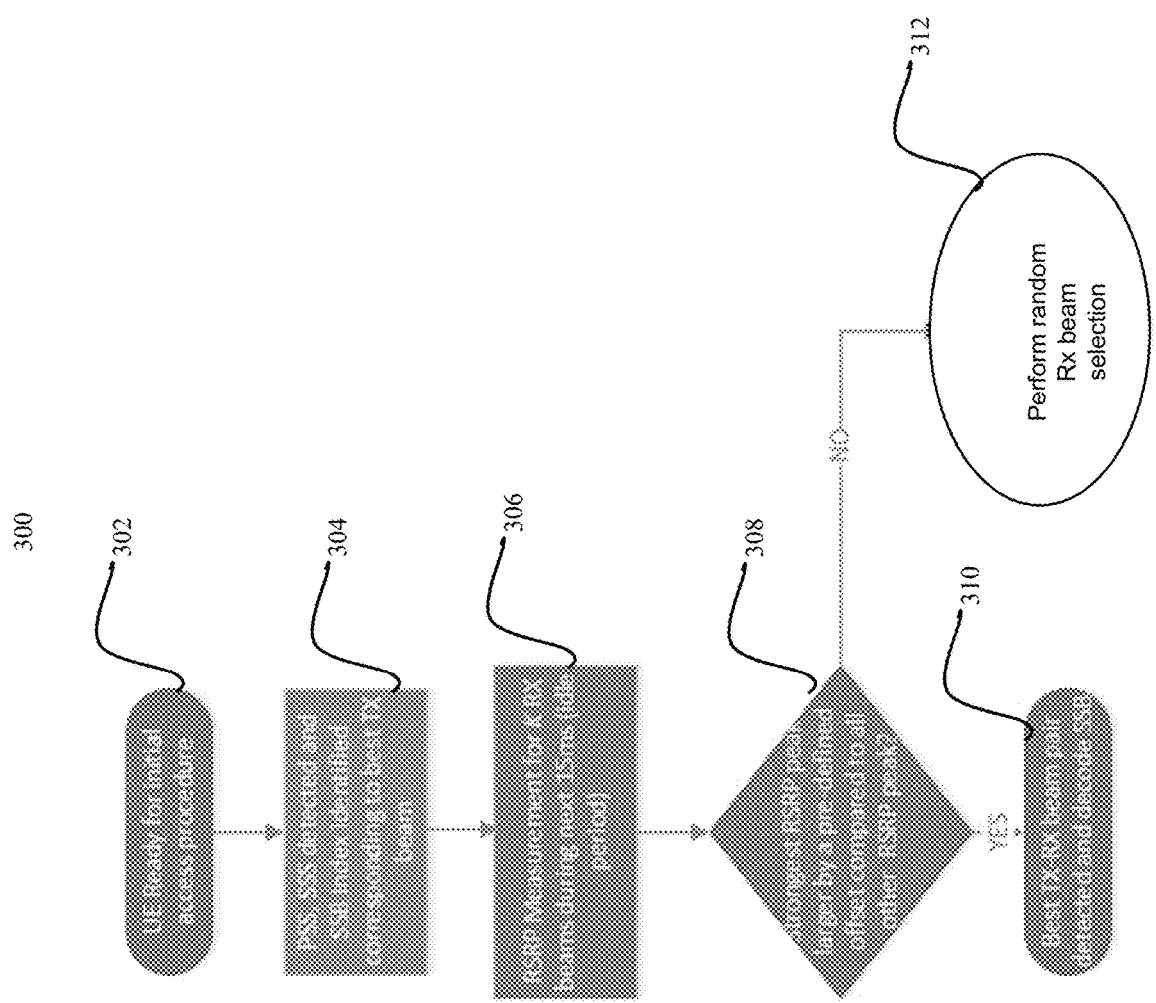
FIG. 3 illustrates an operational flow diagram depicting a process for optimum Receiver (Rx) beam selection in New Radio (NR), in accordance with an embodiment of the present subject matter.

FIG. 3 illustrates an operational flow diagram 300 depicting a process for an optimum Rx beam selection, in accordance with an embodiment of the present subject matter. In an embodiment, the optimum Rx beam may be selected based on an initial synchronization procedure. In an embodiment, the optimum Rx beam may be selected amongst one or more Rx beams for pairing with a Transmitter (Tx) beam. In an embodiment, the Tx beam may be used by a NR node such as a gNB for transmitting a SS burst for a first half-frame. In an embodiment, the first-half frame may be of 5 milli-seconds.

Continuing with the above embodiment, the process may include initiating (step 302) the initial access procedure. In an embodiment, the initial access procedure may be initiated by a UE. In an embodiment, the initial access procedure may be a part of an NR synchronization procedure for connecting the UE to the gNB with a beam tracking to handle a beam adaptation.

Subsequent to initiating the initial access procedure, the process may proceed towards identifying (step 304) the Tx beam and a Synchronization Signal Block (SSB) index corresponding to the Tx beam. In an embodiment, the SSB index may be associated with an SSB amongst a number of SSBs. Furthermore, the number of SSBs may be carried by an SS burst. In an embodiment, the SS burst may be transmitted by the Tx beam for the first half-frame with a specific beam in specific direction with periodicity $T_{SS}$. Upon identifying the Tx beam and the SSB index, the process may include detecting a Primary Synchronization Signal (PSS) and Secondary Synchronization Signal (SSS) corresponding to the Tx beam.

Continuing with the above embodiment, in response to identifying the Tx beam and the SSB index and detecting the PSS and the SSS, the process may proceed towards performing (306) a Reference Signal Received Power (RSRP) measurement for the one or more Rx beams. In an embodiment, the RSRP measurement may be performed during an idle period as a part of the initial synchronization procedure. In an embodiment, the RSRP measurement may be performed on a Demodulation Reference Signal (DMRS) associated with a coreset for a Type-0 Physical Downlink Control Channel (PDCCH) common search space.

In an embodiment, the idle period is a duration of time between two consecutive SSB bursts. In an embodiment, the idle period may be of 15 milli seconds. In an embodiment, the one or more Rx beams may be equal to "k" number of Rx beams. In an embodiment, the RSRP measurement may be performed to determine a Rx beam amongst the one or more Rx beams as the optimum Rx beam such that the Rx beam may be paired with the Tx beam.

In response to performing the RSRP measurement of the one or more Rx beams, the process may include determining (step 308) the optimum Rx beam amongst the one or more Rx beams with a RSRP peak greater than the RSRP peak associated with other Rx beams amongst the one or more Rx beams calculated at the step 306. In an embodiment, the RSRP peak of the optimum Rx beam may be greater than the RSRP peak of the other Rx beams by a pre-defined offset as a part of a beam-sweep operation. In an embodiment, where the optimum Rx beam is determined, the process may proceed towards step 310. In an embodiment, where the optimum Rx beam is not determined, the process may proceed towards step 312.

Moving forward, in response to determining the optimum Rx beam, the process may proceed towards pairing (step 310) the optimum Rx beam with the Tx beam for a Synchronization Signal Block (SSB) detection in the first half-frame of the SSB Burst upon elapse of the idle period.

In an embodiment, where the optimum Rx beam is not determined, the process may proceed towards selecting (step 312) one Rx beam amongst the one or more Rx beams in a random manner after the completion of a SSB periodicity and $T_{ss}$. In an embodiment, the SSB periodicity may be 20 milli seconds.

Figure 4:
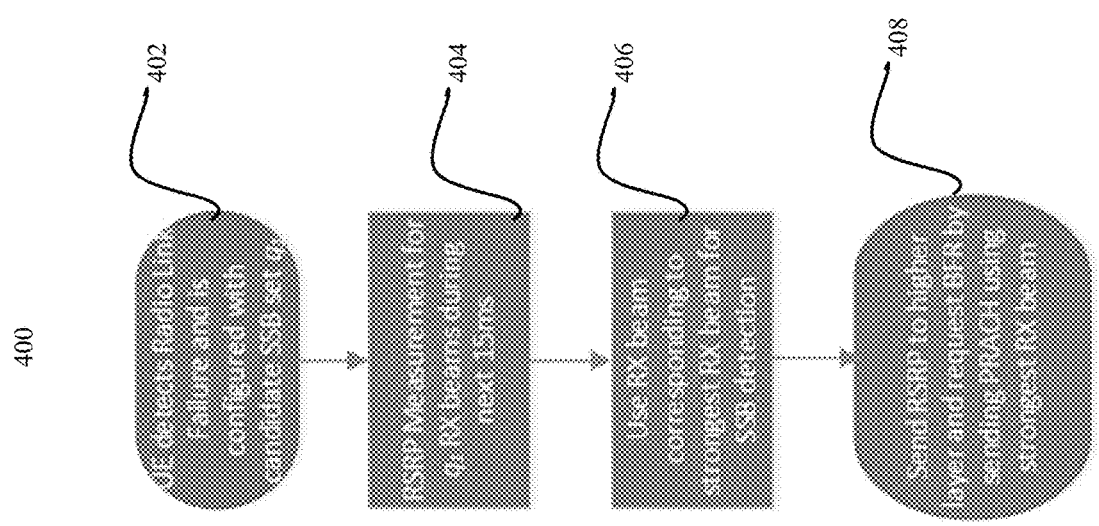
FIG. 4 illustrates an operational flow diagram depicting a process for a beam failure recovery, in accordance with an embodiment of the present subject matter.

FIG. 4 illustrates an operational flow diagram 400 depicting a process for a beam failure recovery, in accordance with an embodiment of the present subject matter. In an embodiment, the beam failure recovery may be initiated upon occurrence of a beam failure. In an embodiment, the beam failure may be based on a failure of a pairing between an optimum Rx beam and a Tx beam. In an embodiment, the Rx beam and the Tx beam may be paired upon performing a RSRP measurement of one or more Rx beams to determine the optimum Rx beam. In an embodiment, the optimum Rx beam may be the Rx beam with a strongest RSRP peak.

Continuing with the above embodiment, the process may include detecting (step 402) a radio link failure between the optimum Rx beam and the Tx beam. In an embodiment, the radio link failure may be the beam failure.

Moving forward, the process may proceed towards, performing (step 404) another RSRP measurement for the one or more Rx beams during another idle period upon occurrence of the beam failure. In an embodiment, the other idle period may be a duration of time between two consecutive SSB bursts. In an embodiment, the other idle period may be of 15 milli seconds. In an embodiment, the other RSRP measurement may be performed using a pre-configured Beam Failure Recovery (BFR) SSB resource. In an embodiment, the pre-configured BFR SSB resource may be another Rx beam amongst the one or more beams. In an embodiment, the other Rx beam may be pre-configured by a network.

Subsequently, upon performing the other RSRP measurement, the process may include performing (step 406) SSB detection for the other Rx beam selected upon other RSRP measurement.

Continuing with the above embodiment, the process may include transmitting (step 408) the RSRP peak associated with the other Rx beam to a higher layer. Further, the process may include transmitting a PRACH using the other Rx beam to the network. In an embodiment, the PRACH may be transmitted to request the BFR.

Figure 5:
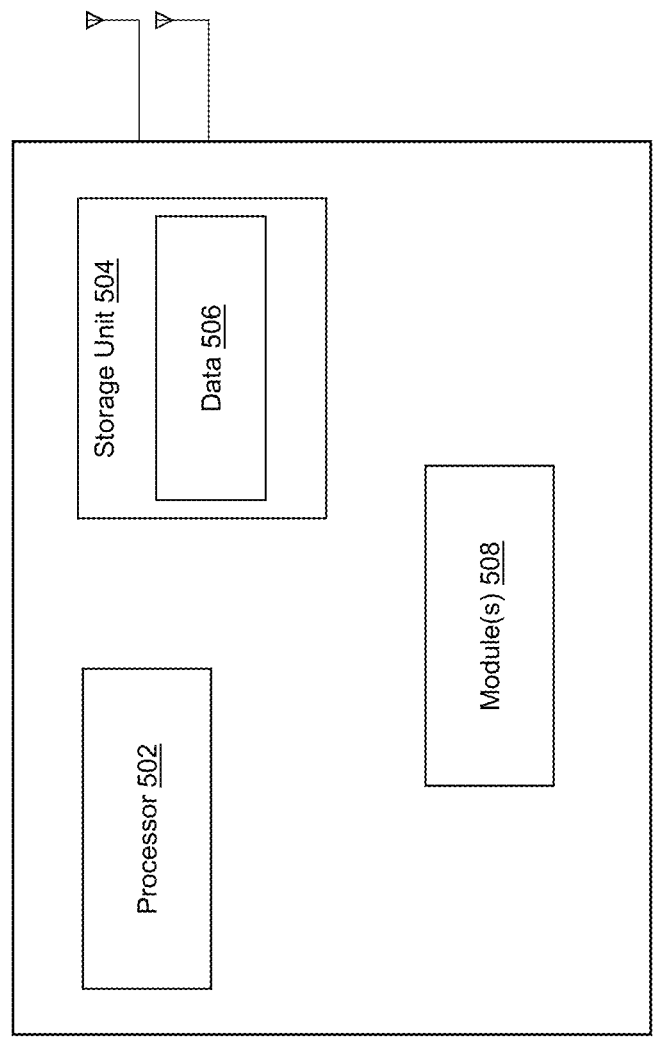
FIG. 5 is a diagram illustrating the configuration of a terminal 200 in a wireless communication system according to an embodiment of the present subject matter.

FIG. 5 is a diagram illustrating the configuration of a terminal 500 in a wireless communication system according to an embodiment of the present subject matter. The configuration of FIG. 4 may be understood as a part of the configuration of the terminal 500. Hereinafter, it is understood that terms including "unit" or "er" at the end may refer to the unit for processing at least one function or operation and may be implemented in hardware, software, or a combination of hardware and software.

In an embodiment, the terminal 500 may include a processor 502 (e.g., at least one processor), a storage unit 504 (e.g., storage), data 506 and, module(s) 508. By way of example, the terminal 500 may be a User Equipment, such as a cellular phone or other device that communicates over a plurality of cellular networks (such as a 4G, a 5G or pre-5G network or any future wireless communication network). In an embodiment, the processor 502, the storage unit 504, the data 506, and the module(s) 508 may be communicably coupled with one another.

As would be appreciated, the terminal 500, may be understood as one or more of a hardware, a software, a logic-based program, a configurable hardware, and the like. In an example, the processor 502 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 502 may be configured to fetch and/or execute computer-readable instructions and/or data 506 stored in the storage unit 504.

In an example, the storage unit 504 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes.

The storage unit 504 may store data, such as a basic program, an application program, configuration information, and the like for operating the terminal 500. The storage unit 504 may be configured as a volatile memory, a non-volatile memory, or a combination of a volatile memory and a non-volatile memory. The storage unit 504 may include the data 506. In addition, the storage unit 504 may provide data stored therein in response to a request from the processor 502.

The data 506 serves, amongst other things, as a repository for storing data processed, received, and generated by one or more of, the processor 502, the storage unit 504, and the module(s) 508.

The module(s) 508, amongst other things, may include routines, programs, objects, components, data structures, etc., which perform particular tasks or implement data types. The module(s) 508 may also be implemented as, signal processor(s), state machine(s), logic circuitries, and/or any other device or component that manipulate signals based on operational instructions.

Further, the module(s) 508 may be implemented in hardware, instructions executed by at least one processing unit, for e.g., processor 502, or by a combination thereof. The processing unit may be a general-purpose processor which executes instructions to cause the general-purpose processor to perform operations or, the processing unit may be dedicated to performing the required functions. In another aspect of the present disclosure, the module(s) 508 may be machine-readable instructions (software) which, when executed by a processor/processing unit, may perform any of the described functionalities.

In some example embodiments, the module(s) 508 may be machine-readable instructions (software) which, when executed by a processor/processing unit, perform any of the described functionalities.

The processor 502 may control overall operations of the terminal 500. For example, the processor 502 may transmit and receive a signal via a communication unit. Further, the processor 502 records data in the storage unit 504 and reads the recorded data. The processor 502 may perform the functions of a protocol stack required by a particular communication standard. To this end, the processor 502 may include at least one processor or micro-processor or may be a part of the processor.

Referring to FIG. 3, the processor 502 may be configured to identify a Tx beam and an SSB index corresponding to the Tx beam associated with an SSB amongst a number of SSBs. In an embodiment, the number of SSBs may be carried by a SS burst transmitted by the Tx beam for a first half-frame. In an embodiment, the first half-frame may be of 5 milli seconds. Continuing with the above embodiment, the processor 502 may be configured to detect a Primary Synchronization Signal (PSS) and Secondary Synchronization Signal (SSS) corresponding to the Tx beam.

Continuing with the above embodiment, the processor may be configured to perform a RSRP measurement for one or more Rx beams during an idle period as a part of an initial synchronization procedure. In an embodiment, the idle period may be between two consecutive SSB bursts. Furthermore, the processor 502 may be configured to determine an optimum Rx beam amongst the one or more Rx beams with a RSRP peak greater than RSRP peak associated with other Rx beams amongst the one or more Rx beams. In an embodiment, the RSRP peak may be greater by a pre-defined offset as a part of a beam-sweep operation.

Moving forward, in response to performing the RSRP measurement and determining the optimum Rx beam, the processor 502 may be configured to pair the optimum Rx beam with the Tx beam for a SSB detection in the first half-frame of the SSB Burst upon elapse of the idle period.

Referring to FIG. 4, in an embodiment, where an occurrence of a beam failure is determined, the processor 502 may be configured to perform another RSRP measurement for the one or more Rx beams during another idle period upon occurrence of a beam failure. In an embodiment, the other idle period may be a duration of time between two consecutive SSB bursts. In an embodiment, the other idle period may be of 15 milli seconds. In an embodiment, the other RSRP measurement may be performed by using a pre-configured BFR SSB resource. Moving forward, the processor 502 may be configured to perform a BFR by using a strongest Rx beam from the one or more Rx beam based on a greatest RSRP peak. In an embodiment, the strongest Rx beam may be the Rx beam with a highest RSRP peak amongst the one or more Rx beams determined during the other RSRP measurement.

In response to performing the other RSRP measurement, the processor 502 may be configured to report a BFR by transmitting the (Physical Random-Access Channel) PRACH using the strongest Rx beam.

Figure 6:
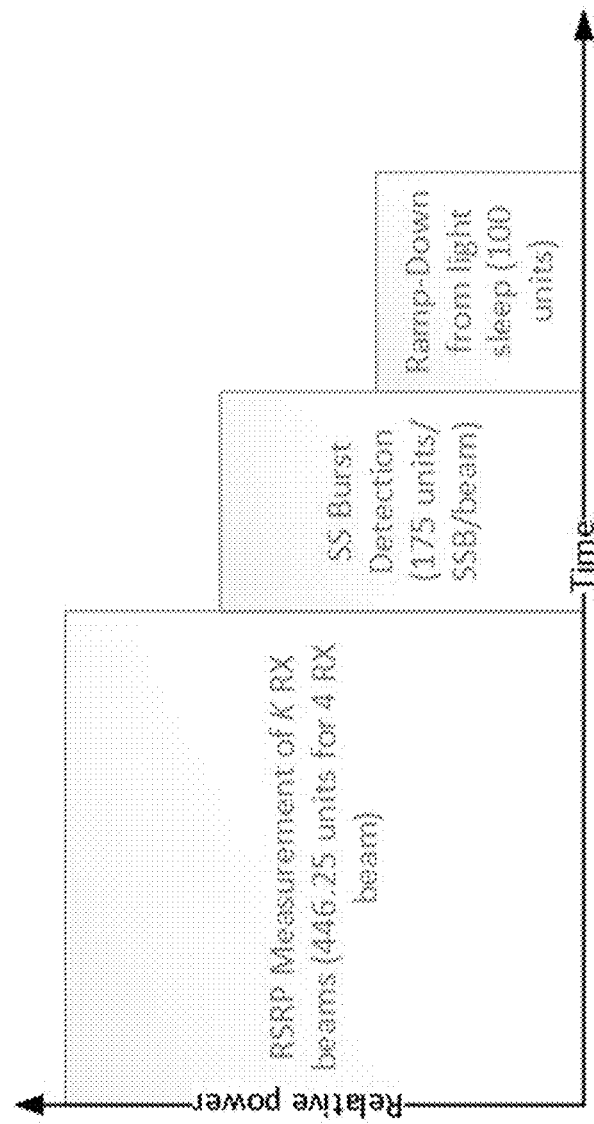
FIG. 6 illustrates a graphical representation depicting a power consumption by a UE, in accordance with an embodiment of the presents subject matter.

FIG. 6 illustrates a graphical representation 600 depicting a power consumption by a UE, in accordance with an embodiment of the presents subject matter. In an embodiment, the power consumed in the process referred in FIG. 3 may be 721.25 units. Further, the power saving may be equal to 48%. The sub-carrier spacing, SSB/PBCH block or PDCCH may be 120 kHz. Also, a system bandwidth may be 100 MHz. Further, a number of carriers may be 1 CC, a number of Rx beam may be 4 and a number of Tx beams may be 64. Max RB for PDCCH Type-0 may be 48.

Figure 7:
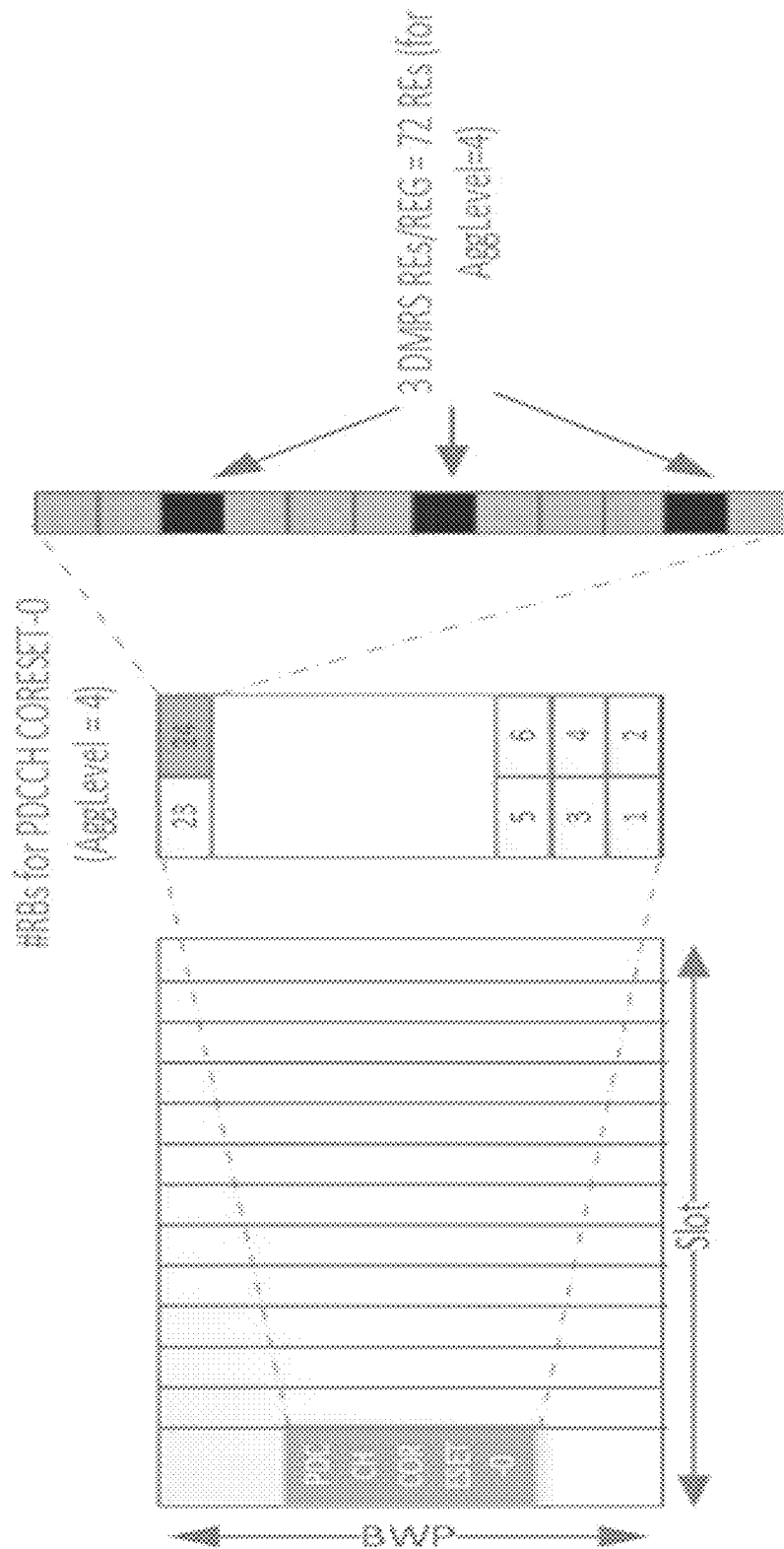
FIG. 7 illustrates a diagram depicting a DMRS location for PDCCH Type-0, in accordance with an embodiment of the present subject matter.

FIG. 7 illustrates a diagram 700 depicting a DMRS location for PDCHH Type-0, in accordance with an embodiment of the present subject matter. In an embodiment, a SS/PBCH and PDCCH subcarrier spacing may be 15 KHz. In an embodiment, N_RB may be 24 and may include 24 symbols. Further, a supported aggregation level may be among 4, 8, and 16. Furthermore, a bundle size may be 6. In an embodiment, the bundle size may be referred as "L reg_bundle size".

In an embodiment, the present subject matter includes a number of advantages such as the RSRP measurements are not stale as collocated near SSB. Furthermore, a faster synchronization leads to saving power at a UE side and a faster radio link recovery. The present subject matter may be used in Multi Subscriber Identity Module (MSIM) MSIM scenario by interleaving same procedure between Subscriber Identity Modules (SIMs) for a faster initial access. Furthermore, no hardware change may be required for realization in a modem.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A method for optimum Receiver (Rx) beam selection in NR, the method comprising:
    performing a Reference Signal Received Power (RSRP) measurement for one or more Rx beams during an idle period as a part of an initial synchronization procedure;
    determining an optimum Rx beam amongst the one or more Rx beams with a RSRP peak greater than RSRP peak associated with other Rx beams amongst the one or more Rx beams by a pre-defined offset as a part of a beam-sweep operation; and
    pairing the optimum Rx beam with a Transmitter (Tx) beam for a Synchronization Signal Block (SSB) detection in a first half-frame of the SSB Burst upon elapse of the idle period.

2. The method as claimed in claim 1, prior to performing the RSRP measurement, further comprising:
    identifying the Tx beam and an SSB index corresponding to the Tx beam associated with an SSB amongst a plurality of SSB, wherein the plurality of SSB is carried by a SS burst transmitted by the Tx beam for a first half-frame; and
    detecting a Primary Synchronization Signal (PSS) and Secondary Synchronization Signal (SSS) corresponding to the Tx beam.

3. The method as claimed in claim 1, further comprising:
    performing another RSRP measurement for the one or more Rx beams during another idle period upon occurrence of a beam failure, using a pre-configured Beam Failure Recovery (BFR) SSB resource;
    performing a BFR by using a strongest Rx beam from the one or more Rx beam based on a greatest RSRP peak;
    reporting a BFR by transmitting the (Physical Random-Access Channel) PRACH using the strongest Rx beam.

4. The method as claimed in claim 1, wherein the RSRP measurement is performed on a Demodulation Reference Signal (DMRS) associated with a coreset for a Type-0 Physical Downlink Control Channel (PDCCH) common search space.

5. The method as claimed in claim 1, wherein the idle period, and the other idle period is a duration of time between two consecutive SSB bursts.

6. A system for optimum Receiver (Rx) beam selection in NR, the system comprising:
    a processor configured to:
        perform a Reference Signal Received Power (RSRP) measurement for one or more Rx beams during an idle period as a part of an initial synchronization procedure;
        determine an optimum Rx beam amongst the one or more Rx beams with a RSRP peak greater than RSRP peak associated with other Rx beams amongst the one or more Rx beams by a pre-defined offset as a part of a beam-sweep operation; and
        pair the optimum Rx beam with a Transmitter (Tx) beam for a Synchronization Signal Block (SSB) detection in a first half-frame of the SSB Burst upon elapse of the idle period.

7. The system as claimed in claim 6, prior to performing the RSRP measurement, further comprising:
    The processor configured to:
        identify the Tx beam and an SSB index corresponding to the Tx beam associated with an SSB amongst a plurality of SSB, wherein the plurality of SSB is carried by a SS burst transmitted by the Tx beam for a first half-frame; and detect a Primary Synchronization Signal (PSS) and Secondary Synchronization Signal (SSS) corresponding to the Tx beam.

8. The system as claimed in claim 6, further comprising:
the processor configured to:
perform another RSRP measurement for the one or more Rx beams during another idle period upon occurrence of a beam failure, using a pre-configured Beam Failure Recovery (BFR) SSB resource;

perform a BFR by using a strongest Rx beam from the one or more Rx beam based on a greatest RSRP peak;

report a BFR by transmitting the (Physical Random-Access Channel) PRACH using the strongest Rx beam.

9. The system as claimed in claim 6, wherein the RSRP measurement is performed on a Demodulation Reference Signal (DMRS) associated with a coreset for a Type-0 Physical Downlink Control Channel (PDCCH) common search space.

10. The system as claimed in claim 6, wherein the idle period, and the other idle period is a duration of time between two consecutive SSB bursts.

\* \* \* \* \*